Nov. 7, 1939. M. B. BENSON 2,179,082

WINCH

Filed June 12, 1937 3 Sheets-Sheet 1

INVENTOR
Melvin B. Benson
BY
ATTORNEY

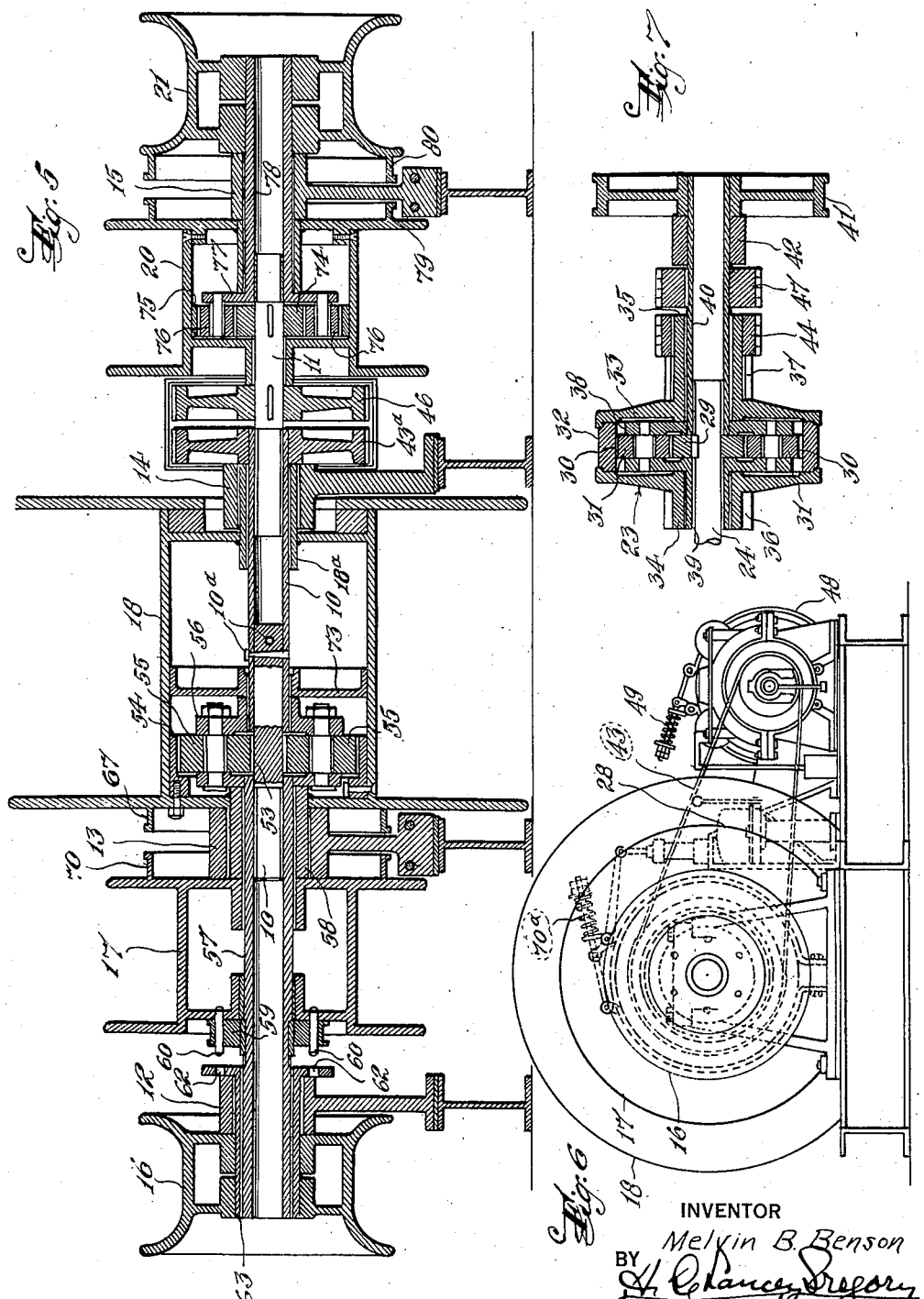

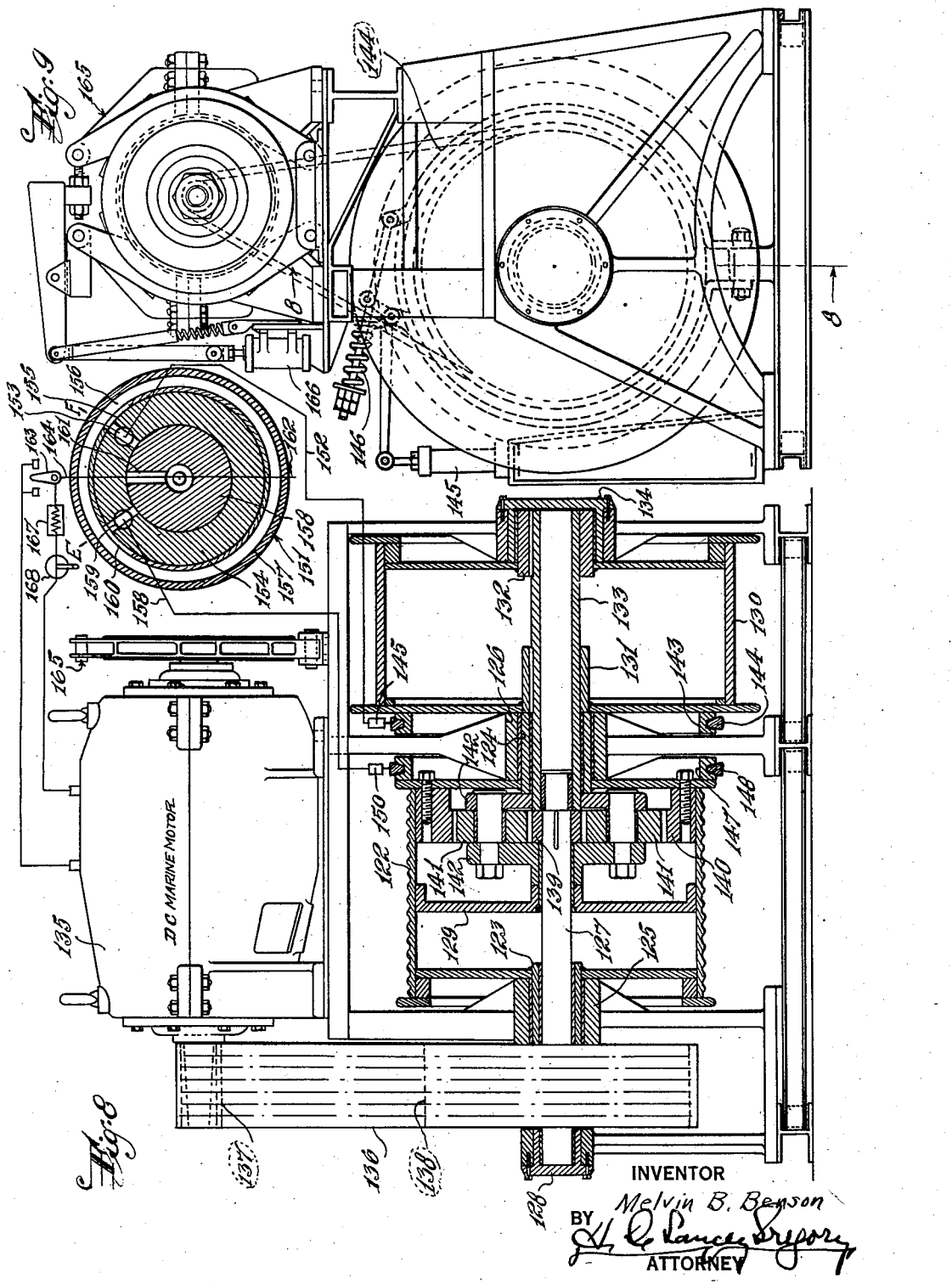

Patented Nov. 7, 1939

2,179,082

UNITED STATES PATENT OFFICE 2,179,082

WINCH

Melvin B. Benson, New York, N. Y., assignor to Lidgerwood Manufacturing Company, Elizabeth, N. J., a corporation of New York Application June 12, 1937, Serial No. 147,857

12 Claims. (Cl. 254—185)

My invention relates to improvements in winches of the general type such as are used aboard ship for towing and mine sweeping, and cargo handling.

One of the objects of my invention is the provision of an improved construction for winches of the character referred to which has advantages over the various constructions used heretofore in the way of greater ease and safety of operation, compactness, lighter weight for a given capacity, greater ease of making adjustments, and higher efficiency.

Other objects and advantages will hereinafter appear.

For the purpose of illustrating my invention, several embodiments thereof are shown in the drawings, in which Figure 1 is a simplified, plan view, partly diagrammatic and partly in section, of a towing and mine sweeping winch constructed and operating in accordance with my invention, the section being taken on the line 1—1 in Fig. 2, some of the parts being removed for the sake of clearness;

Figs. 2 and 3 are enlarged, fragmentary, sectional views, the sections being taken on the lines 2—2 and 3—3, respectively, in Fig. 1;

Fig. 4 is an enlarged, fragmentary view, partly in section, taken from Fig. 1;

Fig. 5 is an enlarged sectional view, the section being taken on the line 5—5 in Fig. 1;

Fig. 6 is a simplified, end, elevational view, looking toward the right in Fig. 1;

Fig. 7 is an enlarged, detail, sectional view, the section being taken on the line 7—7 in Fig. 1;

Fig. 8 is a simplified, elevational view, partly diagrammatic and partly in section, of a cargo winch constructed and operating in accordance with my invention, the section being taken on the line 8—8 in Fig. 9, some of the parts being removed for the sake of clearness; and Fig. 9 is a simplified, end elevational view, looking toward the left in Fig. 8.

With reference to Figs. 1 to 7, the reference numerals 10 and 11 designate input shafts supported in alignment by bearings 12, 13, 14 and 15 for rotation about a common axis and independently of each other. A gypsy 16 and two drums 17 and 18 are driven by means of planetary gearing 19 from the input shaft 10, and a drum 20 and a gypsy 21 are driven by means of planetary gearing 22 from the input shaft 11. The input shafts 10 and 11 are selectively connected by means of planetary gearing 23 to a single power shaft 24 driven by an electric motor 25.

In operation, only one of the gypsies or only one of the drums can be operated at a time. The particular gypsy or drum to be operated is selected by turning the handle 26 of a single, fluid-pressure valve 27 to definite positions A, B, N, C and D, the valve being shown in position N, after which the master controller 28 of the motor is actuated to cause rotation of the selected gypsy or drum in either direction and at the desired speed. That is, the position of the single valve 27 determines not only which of the input shafts 10 and 11 is to be driven from the power shaft 24, but also which gypsy or drum associated with the driven input shaft is to rotate. With the master controller in "off" position, all gypsies and drums, the two input shafts 10 and 11, and the power shaft 24 are held or locked against rotation.

Coming now to a more detailed explanation of the construction and arrangement to obtain the operating action just explained, it will be seen from Fig. 7 that the planetary gearing 23 comprises a sun gear 29 fixed on and driven directly from the power shaft 24, a ring gear 30, and planet gears 31. The ring gear 30 is on the inside of a brake drum 32 forming part of a casing 33 having hollow stud shafts 34 and 35 which are journalled, respectively, in bearings 36 and 37. The planet gears 31 are carried by a spider 38 having hollow stud shafts 39 and 40 which are journalled, respectively, in the hollow stud shafts 34 and 35. A brake drum 41 is fixed on the hollow shaft 40 which is also journalled in a bearing 42.

The driving connection between the planetary gearing 23 and the input shaft 10 comprises a chain 43 connecting a gear 43a fixed on the shaft 10 and a gear 44 fixed on the hollow shaft 35.

The driving connection between the planetary gearing 23 and the input shaft 11 comprises a chain 45 connecting a gear 46 fixed on the shaft 11 and a gear 47 fixed on the hollow shaft 40.

The drum 32 is held against rotation or released by a friction brake band 48 of a conventional construction and which is applied by a spring 49 and released upon the supply of compressed air to a cylinder 50. The drum 41 is held against rotation or released by a similar friction brake band 51 applied by a spring and released upon the supply of compressed air to a cylinder 52. That is, both brakes are spring-applied and air-released, and it will be seen that with the brake 48 released and the brake 51 applied, the input shaft 10 will be driven from the power shaft 24, and with the brake 48 applied and the brake 51 released, the input shaft 11 will be driven from the power shaft. Also, with the compressed air shut off from both cylinders 50 and 52, and these cylinders vented, both brakes will be applied by the spring pressure to hold the respective drums 32 and 41 against rotation, and accordingly hold or lock both input shafts 10 and 11 and the power shaft 24 against rotation.

The planetary gearing 19 comprises a sun gear 53 fixed on the input shaft 10, a ring gear 54 fixed on the inside of the drum 18, and planet gears 55 carried by a spider 56 in which the shaft 10 is journalled. The spider 56 is provided on one side thereof with a hollow shaft 57 journalled in the hub 58 of the drum 18, the hub 58 being journalled in the bearing 13. The hub 18a of the drum 18 is journalled in the bearing 14, as shown.

The drum 17 is loosely mounted on the hollow shaft 57, and a clutch collar 59 provided with pins 60 is splined on this shaft. With the collar 59 in the righthand position shown, the pins 60 engage in holes in the adjacent face of the drum 17 to couple the latter to the shaft 57 for rotation therewith. With the collar 59 in the lefthand position, the pins 60 engage in holes 62 in the adjacent flange of a sleeve 63 journalled in the bearing 12 and on which the gypsy 16 is fixed. In this way, the gypsy 16 is coupled to the shaft 57 for rotation therewith. As shown in Fig. 4, the collar 59 is moved by a yoke 64 pivotally mounted at 65 and connected in any suitable manner to an air cylinder 66. A compressed spring 66a in the righthand end of the cylinder 66 operates to hold the collar 59 in the righthand position when the pressures in opposite ends of the cylinder are equal. In the particular arrangement shown, it will be seen that upon the supply of compressed air to the righthand end of the cylinder 66, the collar 59 will be held in the righthand position by air pressure as well as by the pressure of the spring 66a, and the drum 17 will accordingly be selected for rotation with the shaft 57, and that upon the supply of compressed air to the lefthand end of this cylinder, the collar 59 will be moved to the left against the action of the spring 66a to select the gypsy 16 for rotation with the shaft 57.

The drum 18 is provided with a brake drum 67 which is released or held against rotation by a friction brake band 68 which, like the brake bands 48 and 51, is applied by a spring to hold the drum 18 against rotation and is released upon the supply of compressed air to an air cylinder 69.

The drum 17 is provided with a brake drum 70 which is released or held against rotation by a friction brake band 71 which, like the brake bands 48, 51 and 68, is applied by a spring 70a to hold the drum 17 against rotation and is released upon the supply of compressed air to an air cylinder 72.

From the foregoing, it will be seen that with the brake 68 released and the brake 71 applied, only the drum 18 will be driven from the input shaft 10 through the planetary gearing, because the planet gears 55 are now held against bodily rotation by the interlocking engagement of the collar 59 with the fixed drum 17. With the brake 68 applied and the brake 71 released, the ring gear 54 will be fixed and the hollow shaft 57 will rotate with the planet gears. In this case, either the gypsy 16 or the drum 17 will be driven from the input shaft 10 through the planetary gearing, depending upon the position of the clutch collar 59.

The planetary gearing runs in oil which is confined in the space between the adjacent face of the drum 18 and a partition 73 through which the input shaft 10 passes with a loose fit.

The planetary gearing 22 comprises a sun gear 74 fixed on the input shaft 11, a ring gear 75 fixed on the inside of the drum 20, and planet gears 76 carried by a spider 77. The spider 77 is provided with a hollow shaft 78 journalled in the bearing 15 and on which the gypsy 21 is fixed. The adjacent end of the input shaft 11 extends into and is journalled in the hollow shaft 78, as shown. The planetary gearing runs in oil which is confined within the drum 20. As shown in Fig. 5, the drum 20 has a bearing on the hollow shaft 78 and on the input shaft 11.

The drum 20 and the gypsy 21 are provided, respectively, with brake drums 79 and 80 which are released or held against rotation by friction brake bands 81 and 82, respectively. The brake bands 81 and 82, like the others, are applied by springs and released upon the supply of compressed air to the air cylinders 83 and 84, respectively.

With the brake 81 released and the brake 82 applied, the planet gears 76 will be held against bodily rotation so that the drum 20 will be driven from the input shaft 11. With the brake 81 applied and the brake 82 released, the ring gear 75 will be held against rotation so that the gypsy 21 will be driven from the input shaft 11.

For the purpose of facilitating assembly, the input shaft 10 is made in two parts, the righthand part which carries the gear 43a and is journalled in the hub 18a of the drum 18, being hollow and receiving the adjacent end of the lefthand part which is solid and carries the sun gear 53. Bolts 10a, passing through the adjacent, interfitting ends of the two parts of shaft 10, fix them for rotation together.

The valve 27 comprises a fixed part 85 provided with ports 86, 87, 88, 89, 90, 91 and 92 which communicate, as designated by the lines 93, 94, 95, 96, 97, 98 and 99, respectively, with the cylinder 52, the lefthand end of the cylinder 66, the cylinder 72 and the righthand end of the cylinder 66, the cylinder 69, the cylinder 83, the cylinder 84, and the cylinder 50, respectively.

The valve 27 has a rotary, conical, central part 100 provided with a cross passage 101 connected, as designated by the line 102, with a compressed-air supply 103. The handle 26 is fixed to the part 100 for rotating the same.

An outer, annular part 105 is rotatable on the fixed part 85, and is connected by a pin 106a to the handle 26 for rotation therewith and with the central part 100. The part 105 is provided with an annular exhaust passage 106 to atmosphere, and with ports 107, 108, 109 and 110 each of which communicates with the exhaust passage 106 and which register, respectively, with the ports 87, 88, 90 and 91, when the valve is in position N. The valve part 105 is also provided with a port 111 which communicates with the exhaust passage 106 and which is extended and disposed as shown so that it opens the port 86 to exhaust only in the three positions A, B and N of the handle 26. The valve part 105 is also provided with a port 112 which communicates with the exhaust passage 106 and which is extended and disposed as shown so that it opens the port 92 to exhaust only in the two positions C and D of the handle 26.

The inner end of the port 86 is extended as shown at the adjacent surface of the central rotary part 100 so that the passage 101 communicates with this port only in the two positions C and D of the handle 26.

The inner end of the port 92 is extended as shown at the adjacent surface of the central rotary part 100, so that the passage 101 communicates with this port only in the three positions of the handle 26 designated as A, B and N.

Connected in the air line 93 leading from the port 86 of valve 27 is a valve 113, and connected in the air line 99 leading from the port 92 of the valve 27 is a valve 114. The valves 113 and 114 are identical in construction and manner of operation, and have a common operating lever 115 disposed between them and connected to their rotary parts. The lever 115 is pulled down by a solenoid 116 when the latter is energized. The solenoid 116 is connected by lines 117 to the master controller 28, and the arrangement and connections are such that the solenoid is deenergized when the controller is in the neutral position shown to shut off the motor, and is energized when the controller is moved to any one of the various steps on either side of the neutral position to cause the motor 25 to operate in one direction or the other, as will be well understood by those skilled in the art. With the solenoid deenergized, a spring 118 is effective to hold the lever 115 in the upper position shown, against a fixed stop 119. In this position of the lever the valve 114 shuts off communication between the port 92 and the brake cylinder 50, and opens this cylinder to atmosphere through the exhaust port 120. When the solenoid is energized, the lever 115 is pulled down to close off the exhaust port 120 and establish communication between the port 92 and the port 121 to the cylinder 50. In like manner, when the solenoid is deenergized, the valve 113 shuts off communication between the port 86 and the brake cylinder 52, and opens this cylinder to atmosphere, and when the solenoid is energized the valve 113 closes the cylinder 52 to exhaust and establishes communication between this cylinder and the port 86 of the valve 27.

With the valve 27 in any one of the three positions A, B and N, the supply of compressed air from the tank 103 will be open to the valve 114 by way of the line 102, the passage 101 and the port 92. However, with the valve 27 in any one of the three positions A, B and N, the valve 113 will be open to exhaust in either position of the latter since the port 86 will, in each of the positions A, B and N, be open to exhaust by way of port 111 and the exhaust passage 106. It will therefore be seen that with the valve 27 in any one of the three positions A, B and N, when the master controller 28 is moved to either side of the neutral position to energize the solenoid 116, compressed air will be permitted to pass through the valve 114 to the brake cylinder 50, but will not be permitted to pass through the valve 113 to the brake cylinder 52. In any one of the three positions A, B and N of the valve 27, therefore, the brake band 48 will be released and the brake band 51 will remain applied so that only the input shaft 10 will be driven by the motor 25 through the planetary gearing 23 when the master controller 28 is moved to either side of its neutral position to energize the solenoid 116 and then start the motor.

With the valve 27 in the position A to place the passage 101 in communication with the port 87, compressed air will be supplied only to the lefthand end of the cylinder 66 so that only the gypsy 16 will be driven from the input shaft 10. With the valve 27 in the position B to place the passage 101 in communication with the port 88, compressed air will be supplied only to the righthand end of the cylinder 66 and to the brake cylinder 72 so that only the drum 17 will be driven from the input shaft 10. With the valve 27 in the position N to place the passage 101 in communication with the port 89, compressed air will be supplied only to the brake cylinder 69 so that only the drum 18 will be driven from the input shaft 10.

With the valve 27 in any one of the two positions C and D, the supply of compressed air from the tank 103 will be open to the valve 113 by way of the line 102, the passage 101 and the port 86. However, with the valve 27 in any one of the two positions C and D, the valve 114 will be open to exhaust in either position of the latter since the port 92 will, in each of the positions C and D, be open to the exhaust by way of port 112 and the exhaust passage 106. It will therefore be seen that with the valve 27 in any one of the two positions C and D, when the master controller 28 is moved to either side of the neutral position to energize the solenoid 116, compressed air will be permitted to pass through the valve 113 to the brake cylinder 52. In any one of the two positions C and D of the valve 27, therefore, the brake band 48 will remain applied so that only the input shaft 11 will be driven by the motor 25 through the planetary gearing 23 when the master controller 28 is moved to either side of its neutral position to energize the solenoid 116 and then start the motor.

With the valve 27 in the position C to place the passage 101 in communication with the port 90, compressed air will be supplied only to the brake cylinder 83 so that only the drum 20 will be driven from the input shaft 11.

With the valve 27 in the position D to place the passage 110 in communication with the port 91, compressed air will be supplied only to the brake cylinder 84 so that only the gypsy 21 will be driven from the input shaft 11.

From the foregoing, it will be seen that by means of the single valve 27, the drums and gypsys can be quickly and easily selected for operation individually, and that only one of the drums or only one of the gypsys can operate at a time.

Figs. 8 and 9 disclose an embodiment of my invention adapted particularly for cargo handling. The reference numeral 122 designates a drum provided at the opposite ends thereof with hollow stud shafts or hubs 123 and 124 journalled, respectively, in bearings 125 and 126.

An input shaft 127 is journalled in a bearing 128 and in the hub 123 and a partition or central wall 129 of the drum 122.

A second drum 130 is mounted on and has its opposite hubs 131 and 132 keyed to a hollow output shaft 133 which is journalled in the hub 124 of the drum 122. The hub 132 of the drum 130 is journalled in a bearing 134.

The input shaft 127 is driven by a motor 135 through a chain 136 connecting a pinion 137 fixed on the motor armature shaft with the sprocket 138 disposed between the bearings 128 and 125.

The drums 122 and 130 are driven, selectively, from the input shaft 127 through planetary gearing comprising a sun gear 139 fixed on the shaft 127, a ring gear 140 fixed on the inside of the drum 122, and planet gears 141 carried by a spider 142 which, on one side, is fixed with respect to the hollow output shaft 133 and, on its other side, is journalled on the input shaft 127.

Fixed with respect to the drum 130 is a brake drum 143 about which is a friction brake band 144. The operating gear or mechanism for the brake band 144 is of a conventional construction, as represented in Fig. 9. That is, upon the admission of compressed air to a cylinder 145, the band 144 is released against the action of a spring 146, and when the compressed air to the cylinder is shut off and the latter exhausted or vented to atmosphere, the spring 146 becomes effective to apply the brake band 144 and hold the drum against rotation and the planet gears 141 against bodily rotation about the common axis of the shafts 127 and 133.

Fixed with respect to the drum 122 is a brake drum 147 about which is a friction brake band 148, the operating gear or mechanism for the latter being similar to that for the brake band 144. That is, upon the admission of compressed air to a cylinder represented at 150 and which corresponds to the cylinder 145, the band 148 is released against the action of a spring similar to and operating in the same manner as the spring 146. When the compressed air to the cylinder 150 is shut off and the latter exhausted or vented to atmosphere, the spring referred to becomes effective to apply the brake band 148 and hold the drum 122 and the ring gear 140 against rotation.

The unit just described might be compared to that part of the winch shown in Figs. 1 and 5 and comprising the drum 20 and the gypsy 21. That is, the gear 138, the input shaft 127, the hollow output shaft 133, the drum 122, the drum 130, the bearing 126, the brake cylinders 150 and 145 in Fig. 8 correspond, respectively, to the gear 46, the input shaft 11, the hollow output shaft 78, the drum 20, the gypsy 21, the bearing 15, and the brake cylinders 83 and 84 in Figs. 1 and 5.

With the input shaft 127 rotating, upon the admission of compressed air to the cylinder 150 to release only the brake band 148, the drum 122 will operate since the brake band 144 remains applied to hold the drum 130 against rotation and the planet gears 141 against bodily rotation about the common axis of the shafts 127 and 133. Upon the admission of compressed air to the cylinder 145 to release only the brake band 144, the drum 130 will operate since the brake band 148 remains applied to hold the drum 122 and the ring gear 140 against rotation.

Selection of the drums 122 and 130 is made by operation of a single valve 151 similar in construction and manner of operation to the valve 27 in Figs. 1 and 2. That is, with the valve in the neutral position shown, the cylinder 145 is open to atmosphere through the pipe connection represented by the line 152, the port 153 in the fixed part 154, and the exhaust passages 155 and 156 in the rotary part 157 which is connected to the rotary part 158 for rotation therewith. Also, with the valve in the neutral position shown, the cylinder 150 is open to atmosphere through the pipe connection represented by the line 158, the port 159 in the fixed part 154, and the exhaust passages 160 and 156 in the rotary part 157. The rotary part 157 is provided with a passage 161 to which compressed air is supplied by a connection represented by the line 162.

From the construction just described, it will be seen that upon rotation of the valve parts 157 and 158 to the position E, compressed air will be supplied to the cylinder 150 to release the brake band 148, and that upon rotation of the valve parts 157 and 158 to the position F, compressed air will be supplied to the cylinder 145 to release the brake band 144.

In the neutral position of the valve 151, a switch 163, connected as shown in the motor supply circuit, is open, but in either of the operating positions E and F of the valve, the switch 163 is closed. For this purpose, the arm of the switch may be connected for rotation with the rotary valve part 158 by a shaft represented by the line 164.

The motor 135 is provided with a brake 165 of a conventional construction, and which is released upon the supply of compressed air to the cylinder 166, under control of a valve which is opened upon excitation of a solenoid 167 connected in the motor circuit.

In operation, the valve 151 is moved to either of the two operating positions E and F, depending upon which of the two drums 122 and 130 is to operate, after which the motor controller 168 is moved to either side of the neutral position in which it is shown to release the brake 165 and cause the motor to operate in the desired direction and at the desired rate.

The switch 163 provides a safety feature whereby the motor can not be started unless the valve 151 is in one of its two operating positions to release either the brake 148 or the brake 144.

If the drum 130 is not required, this is omitted, as well as the associated bearing 134. In such case, also, the output shaft 133 is shortened to extend only a short distance beyond the bearing 126, and is permanently fixed against rotation in any suitable manner so that the planet gears 141 are always fixed against bodily rotation about the common axis of the shafts 127 and 133. The valve 151, also, is simplified so that it has only the one operating position E.

The term "drum" in the claims is used in the broader sense, and is intended to refer also to a gypsy.

It will be understood that various modifications of the disclosed embodiments of my invention are possible without departing from the spirit of my invention or the scope of the claims.

I claim as my invention:

1. In a winch, input shafts supported for rotation independently of each other, drums driven respectively from said shafts, a single power shaft common with respect to said input shafts, means for selectively connecting said input shafts to said power shaft for operation therefrom; said means including planetary gearing comprising a sun gear driven directly from said power shaft, planet gears for driving one of said input shafts, and a ring gear for driving another of said input shafts; and means for selectively holding said ring gear against rotation and said planet gears against bodily rotation about the axis of rotation of said sun gear.

2. In a winch, input shafts supported for rotation independently of each other, drums driven from one of said shafts, a drum driven from another of said shafts, a single power shaft common with respect to said input shafts, means including planetary gearing for selectively driving from said one of said input shafts the respective drums associated therewith, and means for selectively connecting said input shafts to said power shaft for operation therefrom.

3. In a winch, input shafts supported for rotation independently of each other, drums driven from one of said shafts, drums driven from another of said shafts, a single power shaft common with respect to said input shafts, means including planetary gearing for selectively driving from said one of said input shafts the respective drums associated therewith, means including second planetary gearing for selectively driving from said another of said input shafts the respective drums associated therewith, and means for selectively connecting said input shafts to said power shaft for operation therefrom.

4. In a winch, input shafts supported for rotation independently of each other, drums driven from one of said shafts, drums driven from another of said shafts, a single power shaft common with respect to said input shafts, means including planetary gearing for selectively driving from said one of said input shafts the respective drums associated therewith, means including second planetary gearing for selectively driving from said another of said input shafts the respective drums associated therewith, means for selectively connecting said input shafts to said power shaft for operation therefrom; said third-named means including third planetary gearing comprising a sun gear driven directly from said power shaft, planet gears for driving said one of said input shafts and a ring gear for driving said another of said input shafts; and means for selectively holding said ring gear against rotation and said planet gears against bodily rotation about the axis of rotation of said sun gear.

5. In a winch, input shafts supported for rotation independently of each other and about a common axis, drums driven from one of said shafts, drums driven from another of said shafts, a single power shaft common with respect to said input shafts and supported for rotation about an axis substantially parallel to the common axis of rotation of said input shafts, means including planetary gearing for selectively driving from said one of said input shafts the respective drums associated therewith, means including second planetary gearing for selectively driving from said another of said input shafts the respective drums associated therewith, and means for selectively connecting said input shafts to said power shaft for operation therefrom.

6. In a winch, input shafts supported for rotation independently of each other, drums driven from one of said shafts, drums driven from another of said shafts, means for selectively driving from said one of said input shafts the respective drums associated therewith, means for selectively driving from said another of said input shafts the respective drums associated therewith, power means for selectively driving said input shafts, and single means common with respect to all of said drums and to said input shafts and to said power means for controlling said first-named means and said second-named means and said power means to select said drums for operation individually.

7. In a winch, input shafts supported for rotation independently of each other, drums driven from one of said shafts, drums driven from another of said shafts, means including friction brakes for selectively driving from said one of said input shafts the respective drums associated therewith, means including friction brakes for selectively driving from said another of said input shafts the respective drums associated therewith, power means including friction brakes for selectively driving said input shafts, and single means common with respect to all of said brakes for controlling the same to select said drums for operation individually.

8. In a winch, input shafts supported for rotation independently of each other, drums driven from one of said shafts, drums driven from another of said shafts, means for selectively driving from said one of said input shafts the respective drums associated therewith, means for selectively driving from said another of said input shafts the respective drums associated therewith, power means for selectively driving said input shafts, fluid-pressure means for controlling said first-named means and said second-named means and said power means to select said drums for operation individually, and a single valve for controlling said fluid-pressure means.

9. In a winch, input shafts supported for rotation independently of each other, drums driven from one of said shafts, drums driven from another of said shafts, means including friction brakes for selectively driving from said one of said input shafts the respective drums associated therewith, means including friction brakes for selectively driving from said another of said input shafts the respective drums associated therewith, power means including friction brakes for selectively driving said input shafts, fluid-pressure means for controlling said brakes to select said drums for operation individually, and a single valve for controlling said fluid-pressure means.

10. In a winch, input shafts supported for rotation independently of each other, drums driven respectively from said shafts, a single power shaft common with respect to said input shafts, means including planetary gearing for selectively connecting said input shafts to said power shaft for operation therefrom, brake drums associated with said planetary gearing, friction brake bands associated respectively with said brake drums, each of said bands being provided with spring means for applying the same, and fluid-pressure cylinders for controlling the respective bands and each arranged to release the associated band when under fluid pressure and when vented to permit such band to be spring-applied thereby to hold the associated drum against rotation.

11. In a winch, a power shaft, a first drum and a second drum and a third drum supported for rotation about a common axis, planetary gearing disposed in said third drum and providing a driving connection between said shaft and said drums, means for causing said drums to be driven individually and selectively from said shaft through said planetary gearing, said means including a clutch element associated with said first and second drums and movable in a direction substantially parallel to said axis into engagement with either of said first and second drums, and means for controlling said first-named means.

12. In a winch, drums supported for rotation, an input shaft, planetary gearing providing a driving connection between said shaft and said drums, means for causing said drums to be driven individually and selectively from said shaft through said planetary gearing, said means including a clutch element associated with certain of said drums and movable in a direction substantially parallel to the axis of rotation of the latter into either of two operating positions with certain of said drums, and fluid-pressure means for controlling said first-named means and including a single valve movable into different operating positions for selecting the respective drums for rotation by said shaft through said planetary gearing.

MELVIN B. BENSON.